US008200996B2

(12) United States Patent
Tseng et al.

(10) Patent No.: US 8,200,996 B2
(45) Date of Patent: Jun. 12, 2012

(54) NETWORK EQUIPMENT INCLUDING MULTIPLE ETHERNET PORTS CONFIGURED TO COMBINE THE POWER SUPPLIES FROM THE MULTIPLE ETHERNET PORTS

(75) Inventors: Kuo-Hung Tseng, Hsichih (TW); Wen-Ping Liu, Hsichih (TW); Yi-Chang Tsai, Hsichih (TW)

(73) Assignee: Wistron Neweb Corp., Taipei Hsien (TW)

( * ) Notice: Subject to any disclaimer, the term of this patent is extended or adjusted under 35 U.S.C. 154(b) by 336 days.

(21) Appl. No.: 12/456,995

(22) Filed: Jun. 24, 2009

(65) Prior Publication Data

US 2010/0153751 A1 Jun. 17, 2010

(30) Foreign Application Priority Data

Dec. 12, 2008 (TW) .............................. 97148474 A

(51) Int. Cl.
*G06F 1/00* (2006.01)
*G06F 1/26* (2006.01)
(52) U.S. Cl. ......... 713/300; 713/310; 713/330; 713/340
(58) Field of Classification Search .................. 713/300, 713/310, 330, 340
See application file for complete search history.

(56) References Cited

U.S. PATENT DOCUMENTS

| | | | |
|---|---|---|---|
| 2005/0197094 A1* | 9/2005 | Darshan et al. ............... | 455/402 |
| 2006/0112288 A1* | 5/2006 | Schindler ...................... | 713/300 |
| 2006/0163949 A1* | 7/2006 | Barrass ........................... | 307/19 |
| 2006/0210057 A1* | 9/2006 | Stanford ....................... | 379/413 |
| 2007/0021094 A1* | 1/2007 | Elkayam et al. .............. | 455/402 |
| 2007/0041568 A1* | 2/2007 | Ghoshal et al. ............... | 379/324 |
| 2008/0005601 A1* | 1/2008 | Diab ............................. | 713/300 |
| 2008/0074906 A1* | 3/2008 | Tsai et al. .................. | 363/21.01 |
| 2008/0104427 A1* | 5/2008 | Yee et al. ...................... | 713/300 |
| 2009/0031152 A1* | 1/2009 | Bolderl-Ermel et al. ..... | 713/300 |
| 2009/0100275 A1* | 4/2009 | Chang et al. ................. | 713/300 |
| 2009/0309420 A1* | 12/2009 | Phan et al. ...................... | 307/43 |

* cited by examiner

*Primary Examiner* — Vincent Tran
(74) *Attorney, Agent, or Firm* — Kilpatrick Townsend & Stockton LLP

(57) ABSTRACT

A network equipment for a powered device of a PoE system is adapted to be connected to multiple network lines, each transmitting a network signal, and a DC power that is carried on the network signal, and that has a magnitude smaller than a power necessary for driving power-consuming components of the powered device. The network equipment includes: multiple Ethernet network ports, each coupled to a respective network line; a transformer module coupled to the Ethernet network ports, and configured to separate the DC powers from the network signals; a power module coupled to the transformer module for combining the DC powers into a supplying power; and a signal processing circuit coupled to the power module for receiving at least a portion of the supplying power, and coupled to the transformer module for processing the network signals. The supplying power has a magnitude sufficient for driving the power-consuming components.

13 Claims, 8 Drawing Sheets

NETWORK EQUIPMENT INCLUDING MULTIPLE ETHERNET PORTS CONFIGURED TO COMBINE THE POWER SUPPLIES FROM THE MULTIPLE ETHERNET PORTS

CROSS-REFERENCE TO RELATED APPLICATION

This application claims priority to Taiwanese Application No. 097148474, filed Dec. 12, 2008, the disclosure of which is incorporated herein by reference.

BACKGROUND OF THE INVENTION

1. Field of the Invention

The invention relates to a network equipment, more particularly to an Ethernet network equipment.

2. Description of the Related Art

Power over Ethernet (PoE) is a technology for simultaneously supplying direct current (DC) power to a terminal equipment, such as a wireless network router, a web camera, an Internet telephone, etc., during transmission of data signals thereto using a currently-existing Ethernet cabling infrastructure in compliance with the IEEE802.3af international standard. It is relatively convenient this way that the terminal equipment can operate properly once it is coupled to a network cable without the need for additional external power plugs or batteries to supply the power necessary for operation.

According to the IEEE802.3af international standard, a complete PoE system includes a power sourcing equipment (PSE), and a powered device (PD), to which power is supplied by the power sourcing equipment. Referring to FIGS. 1, 2 and 3, the power can be supplied in two ways, one of which is called end-span (as shown in FIGS. 1 and 2), where the DC power is transmitted to the powered device 92 simultaneously with the data signals, and the other one of which is called mid-span (as shown in FIG. 3), where the DC power is transmitted to the powered device 93 via a mid-span PSE 94.

In addition, for power supply of the end-span type, the power can be supplied through the cables of the PoE system according to two schemes, one of which is via pins 1 and 2 and pins 3 and 6 of the power sourcing equipment 91 (as shown in FIG. 1), and the other one of which is via pins 4 and 5 and pins 7 and 8 of the power sourcing equipment 91' (as shown in FIG. 2). It should be noted herein that the Arabic numbers 1, 2, . . . , 8 in FIGS. 1 and 2 are used to indicate the pins of a Catalog 5 network line, i.e., pins 1, 2, . . . , 8. Referring to FIG. 1, under the first scheme, a power generator 93 is connected between center taps of two transformers 95 without interfering with data transmission, and pins 1 and 2 and pins 3 and 6 can have any polarity. Referring to FIG. 2, under the second scheme, pins 4 and 5 are connected to a positive terminal of the power generator 93', and pins 7 and 8 are connected to a negative terminal of the power generator 93'.

According to the IEEE802.3af international standard, the maximum power a power sourcing equipment can provide to a powered device via one pair is 15.4 watts. In a related art, Taiwanese Patent Publication No. 200816704 discloses a power transformer device adapted for use in a powered device of a PoE system.

SUMMARY OF THE INVENTION

Therefore, the main object of the present invention is to provide a network equipment for use in a powered device of a Power over Ethernet (PoE) system, where a power for driving power-consuming components of the powered device can be larger than the 15.4 Watts specified in the IEEE802.3af international standard.

According to the present invention, there is provided a network equipment for use in a powered device of a Power over Ethernet (PoE) system, and adapted to be connected to a plurality of network lines. Each of the network lines transmits a network signal and a direct-current (DC) power carried on the network signal. The DC power has a magnitude that is smaller than a power necessary for driving power-consuming components of the powered device. The network equipment includes a plurality of Ethernet network ports, a transformer module, a power module, and a signal processing circuit.

Each of the Ethernet network ports is adapted to be coupled to a respective one of the network lines.

The transformer module is coupled to the Ethernet network ports, and is configured to separate the DC powers from the network signals transmitted thereto from the network lines via the Ethernet network ports.

The power module is coupled to the transformer module for combining the DC powers separated from the network signals and received from the transformer module into a supplying power.

The signal processing circuit is coupled to the power module for receiving at least a portion of the supplying power therefrom, and is coupled to the transformer module for processing the network signals received therefrom.

The supplying power outputted by the power module has a magnitude that is sufficient for driving the power-consuming components of the powered device.

The Ethernet network ports of this invention may include a first Ethernet network terminal and a second Ethernet network terminal, each of which is coupled to a respective one of a pair of the network lines, namely first and second network lines. Each of the first and second Ethernet network terminals includes first, second, third and fourth pairs of pins. The network signal and the DC power carried on the network signal are transmitted from the first network line to the transformer module via at least a pair of pins selected from the group consisting of one of the first and second pairs of pins of the first Ethernet network terminal, one of the third and fourth pairs of pins of the first Ethernet network terminal, and a combination thereof. The network signal and the DC power carried on the network signal are transmitted from the second network line to the transformer module via at least a pair of pins selected from the group consisting of one of the first and second pairs of pins of the second Ethernet network terminal, one of the third and fourth pairs of pins of the second Ethernet network terminal, and a combination thereof.

The transformer module may include a first transformer circuit and a second transformer circuit. The signal processing circuit may include a first Ethernet physical layer unit and a second Ethernet physical layer unit.

The first transformer circuit is coupled between the first Ethernet network terminal and the first Ethernet physical layer unit, and has four center taps respectively corresponding to the first, second, third and fourth pairs of pins of the first Ethernet network terminal. Voltage of the DC power received from the first network line via the first Ethernet network terminal is transferred to the power module from at least one of the center taps corresponding to the at least one selected pair of pins of the first Ethernet network terminal. The second transformer circuit is coupled between the second Ethernet network terminal and the second Ethernet physical layer unit, and has four center taps respectively corresponding to the first, second, third and fourth pairs of pins of the second Ethernet network terminal. Voltage of the DC power received from the second network line via the second Ethernet network terminal is transferred to the power module from at least one of the center taps corresponding to the at least one selected pair of pins of the second Ethernet network terminal.

Preferably, the first transformer circuit (the second transformer circuit) includes first, second, third and fourth transformers respectively connected between first, second, third and fourth pair of pins of the first Ethernet network terminal (the second Ethernet network terminal) and the first Ethernet physical layer unit (the second Ethernet physical layer unit), and respectively having first, second, third and fourth center taps that are connected to the power module. The first, second, third and fourth center taps of the first, second, third and fourth transformers of the first transformer circuit cooperate to form the four center taps of the first transformer circuit. The first, second, third and fourth center taps of the first, second, third and fourth transformers of the second transformer circuit cooperate to form the four center taps of the second transformer circuit.

The network signal and the DC power carried on the network signal are transmitted from the first network line to the transformer module via one of the first and second pairs of pins of the first Ethernet network terminal and/or one of the third and fourth pairs of pins of the first Ethernet network terminal, as long as the first and second pairs of pins are not used simultaneously for transmitting the network signal and the DC power carried thereon, and as long as the third and fourth pairs of pins are not used simultaneously for transmitting the network signal and the DC power carried thereon. Similarly, the network signal and the DC power carried on the network signal are transmitted from the second network line to the transformer module via one of the first and second pairs of pins of the second Ethernet network terminal and/or one of the third and fourth pairs of pins of the second Ethernet network terminal, as long as the first and second pairs of pins are not used simultaneously for transmitting the network signal and the DC power carried thereon, and as long as the third and fourth pairs of pins are not used simultaneously for transmitting the network signal and the DC power carried thereon.

The power module may include first, second, third and fourth bridge rectifiers respectively connected to the first and second center taps of the first transformer circuit, the third and fourth center taps of the first transformer circuit, the first and second center taps of the second transformer circuit, and the third and fourth center taps of the second transformer circuit. The power module may further include four DC/DC converters coupled respectively to the first, second, third and fourth bridge rectifiers, and having output terminals that are connected together in one of a series connection and a parallel connection. Alternatively, the power module may further include two DC/DC converters, where a first DC/DC converter is coupled to parallel connected output sides of the first and second bridge rectifiers, and a second DC/DC converter is coupled to parallel-connected output sides of the third and fourth bridge rectifiers. In either case, output sides of the DC/DC converters are connected together in one of a series connection and a parallel connection so as to generate the supplying power.

Moreover, each of the first and second Ethernet network terminals is an RJ-45 terminal. The first pair of pins of each of the first and second Ethernet network terminals includes first and second pins of the RJ-45 terminal. The second pair of pins of each of the first and second Ethernet network terminals includes third and sixth pins of the RJ-45 terminal. The third pair of pins of each of the first and second Ethernet network terminals includes fourth and fifth pins of the RJ-45 terminal. The fourth pair of pins of each of the first and second Ethernet network terminals includes seventh and eighth pins of the RJ-45 terminal.

The effect of this invention is to provide, from a DC power with a magnitude smaller than the power necessary for driving the power-consuming components of the powered device, a stable supplying power that has a magnitude sufficient for driving the power-consuming components of the powered device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
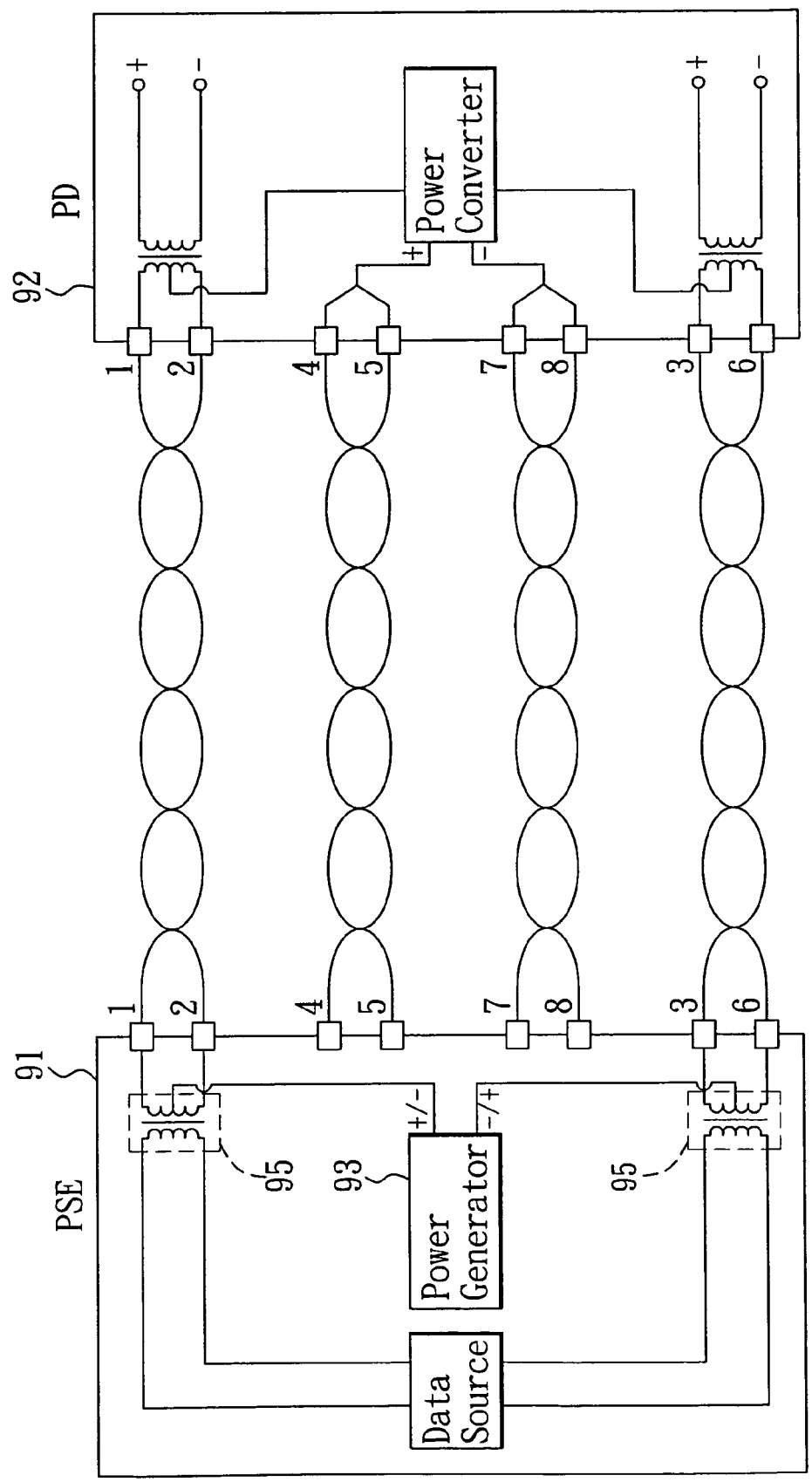
FIG. 1 is a schematic circuit diagram, illustrating a conventional Power over Ethernet (PoE) system, where power is supplied through cables of the PoE system to a powered device via pins 1 and 2 and pins 3 and 6 of a power sourcing equipment.
Figure 2:
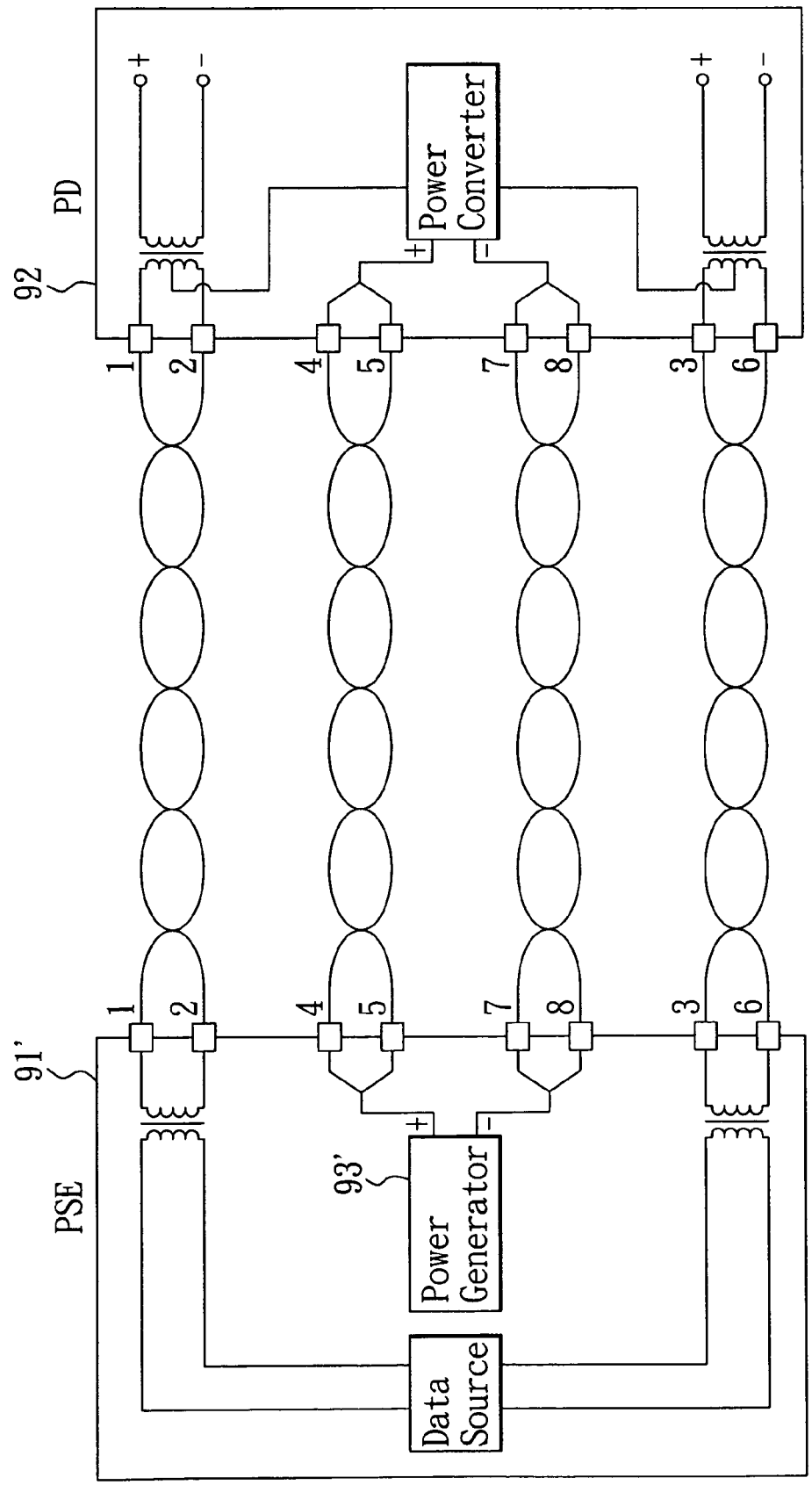
FIG. 2 is a schematic circuit diagram, illustrating another conventional PoE system, where power is supplied through cables of the PoE system to a powered device via pins 4 and 5 and pins 7 and 8 of a power sourcing equipment.
Figure 3:
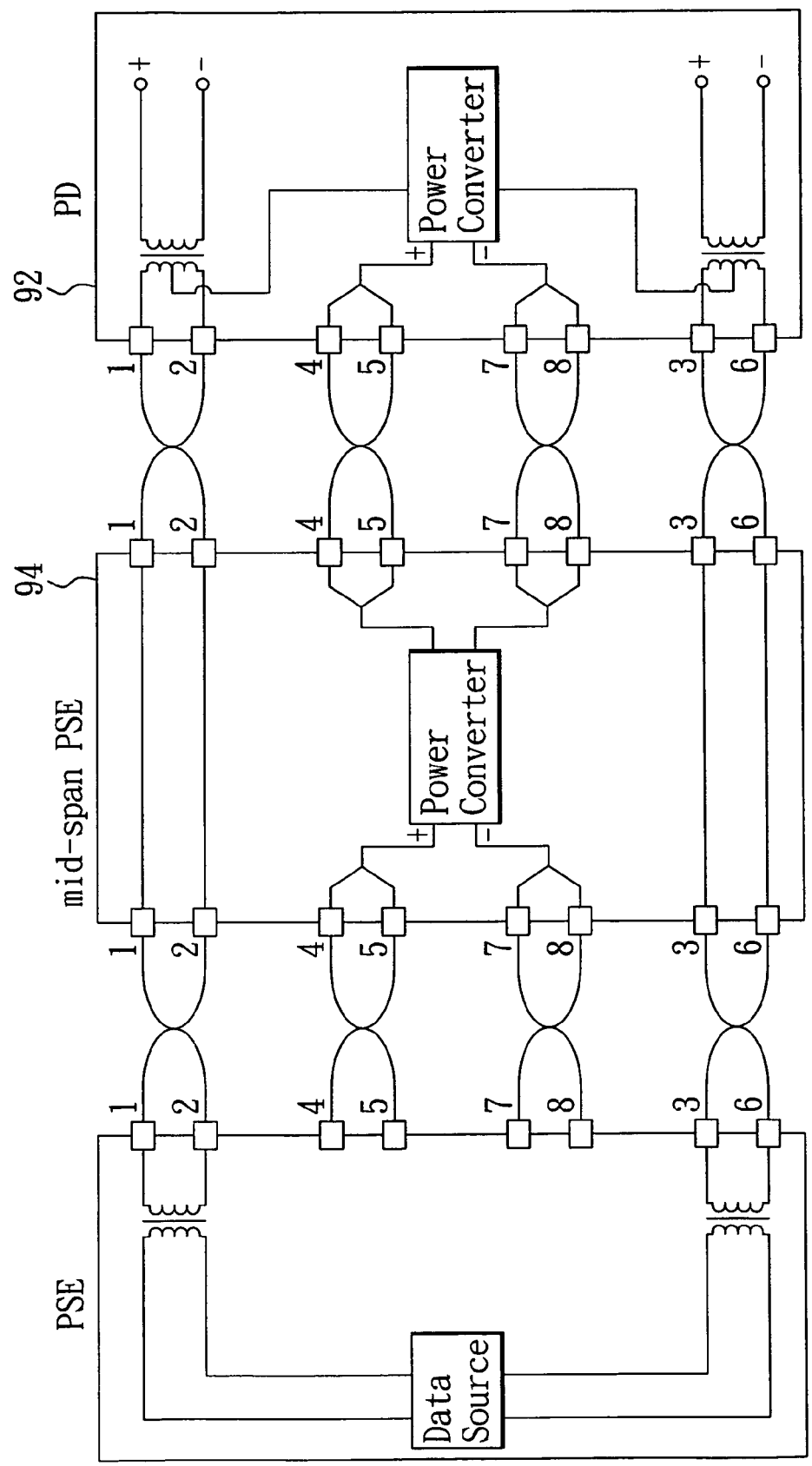
FIG. 3 is a schematic circuit diagram, illustrating yet another conventional PoE system, where power is transmitted to the powered device via a mid-span power sourcing equipment.

Before the present invention is described in greater detail with reference to the accompanying preferred embodiments, it should be noted herein that like elements are denoted by the same reference numerals throughout the disclosure.

Figure 4:
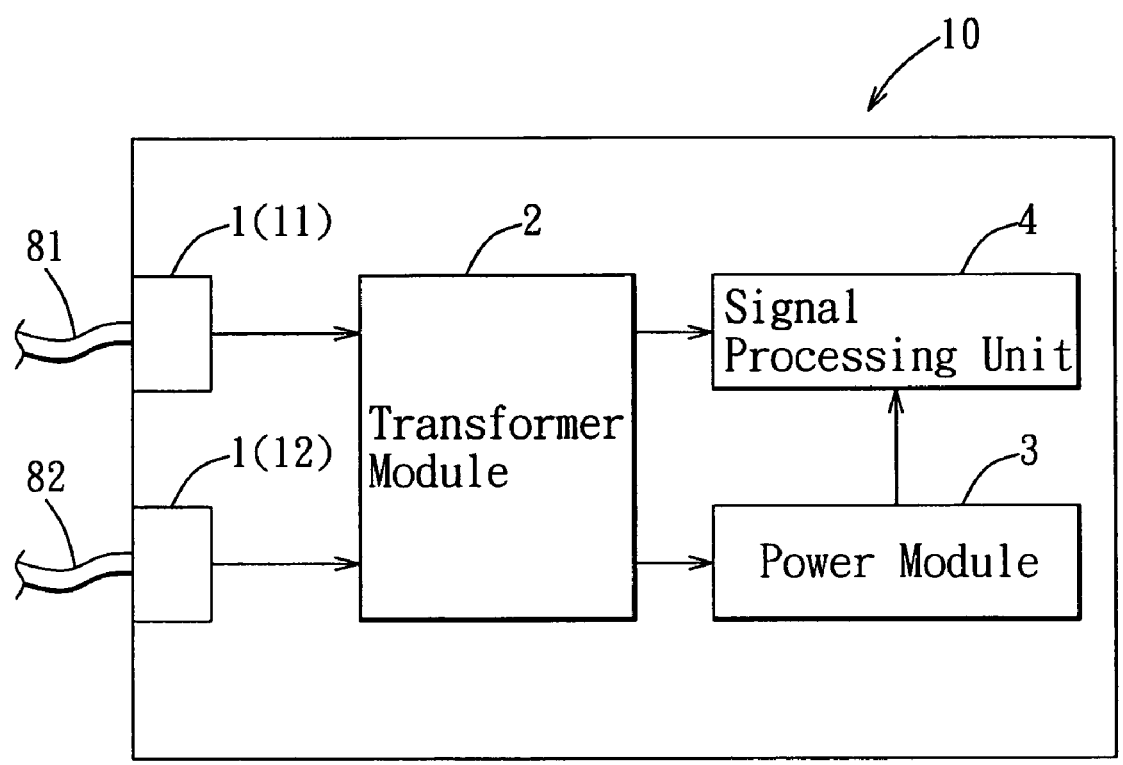
FIG. 4 is a block diagram of the first preferred embodiment of a network equipment according to the present invention.

Referring to FIG. 4, the first preferred embodiment of a network equipment 10 according to the present invention is adapted for use in a powered device (PD) (not shown), such as a wireless access point (AP), a modem, etc., of a Power over Ethernet (PoE) system (not shown). In this embodiment, the network equipment 10 is adapted to be coupled to two network lines 81, 82, namely first and second network lines 81, 82. Each of the network lines 81, 82 transmits a network signal that comes from a power sourcing equipment (PSE) of the PoE system, and that complies with the IEEE802.3af international standard, and a DC power that is carried on the network signal. The network equipment 10 includes a plurality of Ethernet network ports 1, a transformer module 2, a power module 3, and a signal processing circuit 4.

Figure 5:
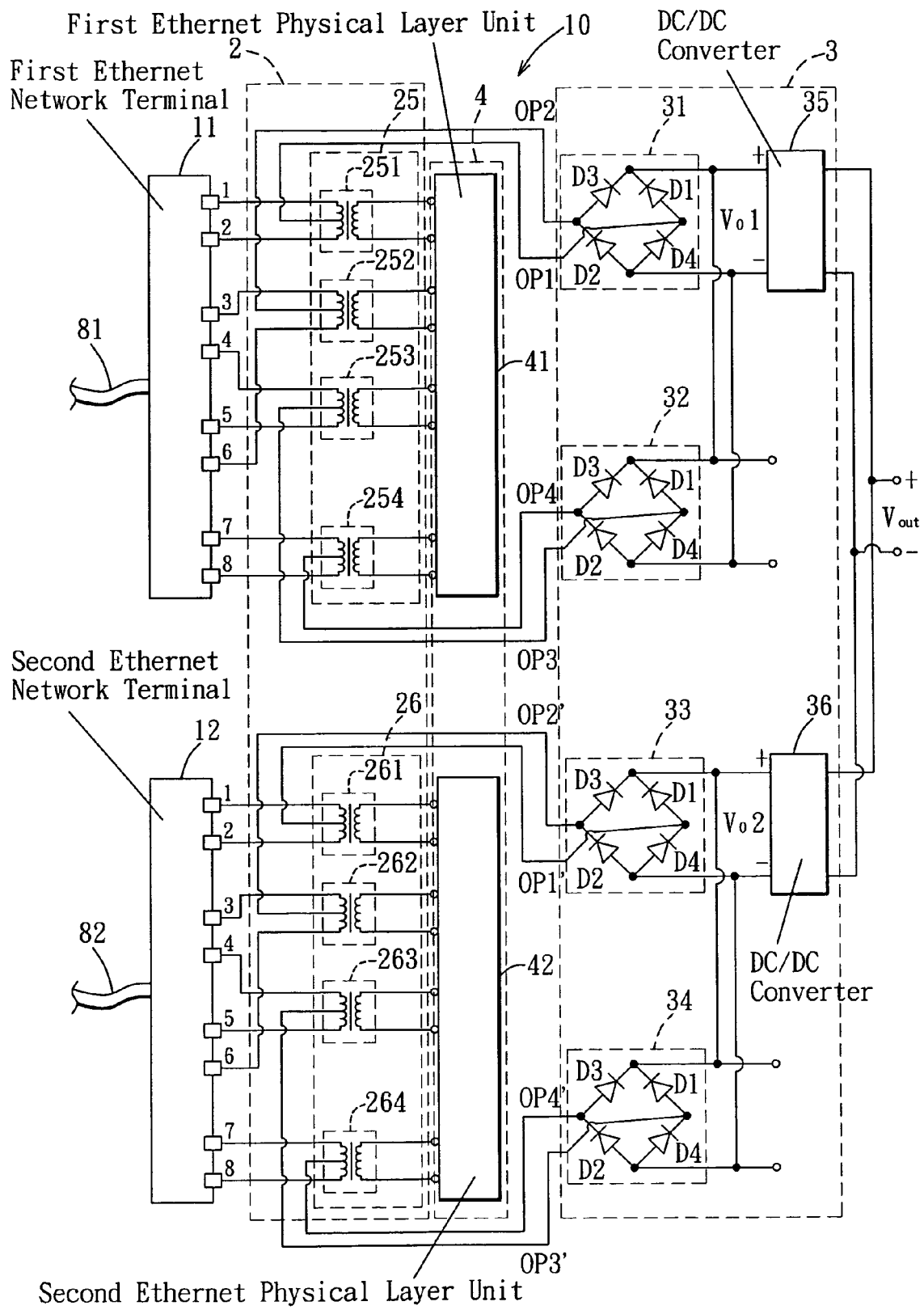
FIG. 5 is a circuit block diagram of the first preferred embodiment.

According to the IEEE802.3af international standard, each of the first and second network lines 81, 82 can only transmit a direct-current (DC) power to a certain limit. Therefore, the number of Ethernet network ports 1 to be used in the network equipment 10 can be determined by a circuit designer according to the system requirement of the network equipment 10. Referring to FIG. 5, two Ethernet network ports 1 are included in the network equipment 10 of this embodiment, namely a first Ethernet network terminal 11 and a second Ethernet network terminal 12. Each of the first and second Ethernet network terminals 11, 12 of this embodiment is an RJ-45 terminal that is commonly employed in existing network systems. The first and second Ethernet network terminals 11, 12 are respectively adapted to be coupled to the first and second network lines 81, 82.

The first Ethernet network terminal 11 has a first pair of pins (the first and second pins of the RJ-45 terminal), a second pair of pins (the third and sixth pins of the RJ-45 terminal), a third pair of pins (the fourth and fifth pins of the RJ-45 terminal), and a fourth pair of pins (the seventh and eighth pins of the RJ-45 terminal). The network signal and the DC power carried on the network signal are transmitted from the first network line 81 to the transformer module 2 via at least a pair of pins selected from the group consisting of one of the first and second pairs of pins of the first Ethernet network terminal 11, one of the third and fourth pairs of pins of the first Ethernet network terminal 11, and a combination thereof. In this embodiment, the network signal and the DC power carried on the network signal are transmitted from the first network line 81 to the transformer module 2 via the first and third pairs of pins of the first Ethernet network terminal 11. Alternatively, the network signal and the DC power carried on the network signal can be transmitted from the first network line 81 to the transformer module 2 via the second and fourth pairs of pins, or via the first and fourth pairs of pins, or via the second and third pairs of pins of the first Ethernet network terminal 11, as long as the first and second pairs of pins are not used simultaneously for transmitting the network signal and the DC power carried thereon, and as long as the third and fourth pairs of pins are not used simultaneously for transmitting the network signal and the DC power carried thereon.

The structure of the second Ethernet network terminal 12 is identical to that of the first Ethernet network terminal 11, i.e., the second Ethernet network terminal 12 has a first pair of pins (the first and second pins of the RJ-45 terminal), a second pair of pins (the third and sixth pins of the RJ-45 terminal), a third pair of pins (the fourth and fifth pins of the RJ-45 terminal), and a fourth pair of pins (the seventh and eighth pins of the RJ-45 terminal). The network signal and the DC power carried on the network signal are transmitted from the second network line 82 to the transformer module 2 via at least a pair of pins selected from the group consisting of one of the first and second pairs of pins of the second Ethernet network terminal 12, one of the third and fourth pairs of pins of the second Ethernet network terminal 12, and a combination thereof. In this embodiment, the network signal and the DC power carried on the network signal are transmitted from the second network line 82 to the transformer module 2 via the first and third pairs of pins of the second Ethernet network terminal 12.

The transformer module 2 is coupled to the first and second Ethernet network terminals 11, 12, and is configured to separate the DC powers from the network signals transmitted thereto from the first and second network lines 81, 82 via the first and second Ethernet network terminals 11, 12. In this embodiment, the transformer module 2 includes a first transformer circuit 25 and a second transformer circuit 26.

The power module 3 is coupled to the transformer module 2 for combining the DC powers separated from the network signals and received from the transformer module 2 into a supplying power.

The signal processing circuit 4 is coupled to the power module 3 for receiving at least a portion of the supplying power therefrom, and is coupled to the transformer module 2 for processing the network signals received therefrom. Alternatively, a power management circuit (not shown) can be coupled between the signal processing circuit 4 and the power module 3 for managing the supplying power generated by the power module 3, and distributing the supplying power to the power-consuming components of the powered device. It should also be noted herein that the connection between the signal processing circuit 4 and the power module 3 are omitted in FIGS. 5~8 for simplicity.

In this embodiment, the signal processing circuit 4 includes a first Ethernet physical layer unit 41 and a second Ethernet physical layer unit 42. The first transformer circuit 25 is coupled between the first Ethernet network terminal 11 and the first Ethernet physical layer unit 41 of the signal processing circuit 4, and has four center taps respectively corresponding to the first, second, third and fourth pairs of pins of the first Ethernet network terminal 11. Voltage of the DC power received from the first network line 81 via the first Ethernet network terminal 11 is transferred to the power module 3 from at least one of the center taps corresponding to the at least one selected pair of pins of the first Ethernet network terminal 11. In particular, the first transformer circuit 25 includes: a first transformer 251 connected between the first pair of pins of the first Ethernet network terminal 11 and the first Ethernet physical layer unit 41, and having a first center tap (OP1) connected to the power module 3; a second transformer 252 connected between the second pair of pins of the first Ethernet network terminal 11 and the first Ethernet physical layer unit 41, and having a second center tap (OP2) connected to the power module 3; a third transformer 253 connected between the third pair of pins of the first Ethernet network terminal 11 and the first Ethernet physical layer unit 41, and having a third center tap (OP3) connected to the power module 3; and a fourth transformer 254 connected between the fourth pair of pins of the first Ethernet network terminal 11 and the first Ethernet physical layer unit 41, and having a fourth center tap (OP4) connected to the power module 3. The first, second, third and fourth center taps (OP1, OP2, OP3, OP4) of the first, second, third and fourth transformers 251, 252, 253, 254 of the first transformer circuit 25 cooperate to form the four center taps of the first transformer circuit 25.

For the first transformer 251, the network signal transmitted from the first network line 81 via the first pair of pins of the first Ethernet network terminal 11 is received by the first Ethernet physical layer unit 41 of the signal processing unit 4 via the first transformer 251, while voltage of the DC power transmitted from the first network line 81 via the first pair of pins of the first Ethernet network terminal 11 is transferred to the power module 3 from the first center tap (OP1) corresponding to the first pair of pins of the first Ethernet network terminal 11. In other words, the DC power is separated, by the first transformer 251, from the network signal transmitted from the first network line 81 via the first pair of pins of the first Ethernet network terminal 11. Similarly, voltage of the DC power transmitted from the first network line 81 via the second pair of pins of the first Ethernet network terminal 11 is transferred to the power module 3 from the second center tap (OP2) corresponding to the second pair of pins of the first Ethernet network terminal 11, voltage of the DC power transmitted from the first network line 81 via the third pair of pins of the first Ethernet network terminal 11 is transferred to the power module 3 from the third center tap (OP3) corresponding to the third pair of pins of the first Ethernet network terminal 11, and voltage of the DC power transmitted from the first network line 81 via the fourth pair of pins of the first Ethernet network terminal 11 is transferred to the power module 3 from the fourth center tap (OP4) corresponding to the fourth pair of pins of the first Ethernet network terminal 11. However, since in this embodiment, the network signals, along with the DC powers, are transmitted from the first network line 81 to the first transformer circuit 25 via the first and third pairs of pins of the first Ethernet network terminal 11, the voltages at the second and fourth center taps (OP2, OP4) of the first transformer circuit 25 are both zero.

In this embodiment, the second transformer circuit 26 is coupled between the second Ethernet network terminal 12 and the second Ethernet physical layer unit 42 of the signal processing circuit 4, and has four center taps respectively corresponding to the first, second, third and fourth pairs of pins of the second Ethernet network terminal 12. Voltage of the DC power received from the second network line 82 via the second Ethernet network terminal 12 is transferred to the power module 3 from at least one of the center taps corresponding to the at least one selected pair of pins of the second Ethernet network terminal 12. In particular, the second transformer circuit 26 includes: a first transformer 261 connected between the first pair of pins of the second Ethernet network terminal 12 and the second Ethernet physical layer unit 42, and having a first center tap (OP1') connected to the power module 3; a second transformer 262 connected between the second pair of pins of the second Ethernet network terminal 12 and the second Ethernet physical layer unit 42, and having a second center tap (OP2') connected to the power module 3; a third transformer 263 connected between the third pair of pins of the second Ethernet network terminal 12 and the second Ethernet physical layer unit 42, and having a third center tap (OP3') connected to the power module 3; and a fourth transformer 264 connected between the fourth pair of pins of the second Ethernet network terminal 12 and the second Ethernet physical layer unit 42, and having a fourth center tap (OP4') connected to the power module 3. The first, second, third and fourth center taps (OP1', OP2', OP3', OP4') of the first, second, third and fourth transformers 261, 262, 263, 264 of the second transformer circuit 26 cooperate to form the four center taps of the second transformer circuit 26.

The second transformer circuit 26 operates in the same manner as the first transformer circuit 25. In other words, voltage of the DC power transmitted from the second network line 82 via the first pair of pins of the second Ethernet network terminal 12 is transferred to the power module 3 from the first center tap (OP1') corresponding to the first pair of pins of the second Ethernet network terminal 12, voltage of the DC power transmitted from the second network line 82 via the second pair of pins of the second Ethernet network terminal 12 is transferred to the power module 3 from the second center tap (OP2') corresponding to the second pair of pins of the second Ethernet network terminal 12, voltage of the DC power transmitted from the second network line 82 via the third pair of pins of the second Ethernet network terminal 12 is transferred to the power module 3 from the third center tap (OP3') corresponding to the third pair of pins of the second Ethernet network terminal 12, and voltage of the DC power transmitted from the second network line 82 via the fourth pair of pins of the second Ethernet network terminal 12 is transferred to the power module 3 from the fourth center tap (OP4') corresponding to the fourth pair of pins of the second Ethernet network terminal 12. Like the first transformer circuit 25, in this embodiment, since the network signals, along with the DC powers, are transmitted from the second network line 82 to the second transformer circuit 26 via the first and third pairs of pins of the second Ethernet network terminal 12, the voltages at the second and fourth center taps (OP2', OP4') of the second transformer circuit 26 are both zero.

Alternatively, the first pair of pins of the first Ethernet network terminal 11 may share the first transformer 251 with the second pair of pins by connecting the third pin to the first pin, and connecting the sixth pin to the second pin. In the same manner, the third pair of pins of the first Ethernet network terminal 11 may share the third transformer 252 with the fourth pair of pins by connecting the seventh pin to the fourth pin, and connecting the eighth pin to the fifth pin. This way, the number of transformers in the first transformer circuit 25 is reduced. Likewise, the number of transformers required in the second transformer circuit 26 may also be reduced in a similar fashion.

It is worth to note that, apart from serving the purpose of separating the DC powers from the network signals, the transformer module 2 also serves to isolate the signal processing circuit 4 from the power module 3, so that generation of the supplying power by the power module 3 does not affect signal processing performed by the signal processing circuit 4. In addition, the winding ratios of all the transformers 251~254, 261~264 are 1:1 in this embodiment. Therefore, the voltages transferred to the power module 3 via the center taps (OP1~OP4, OP1'~OP4') of the transformers 251~254, 261~264 have identical magnitude as the DC powers transmitted from the first and second Ethernet network terminals 11, 12.

Moreover, it should be noted herein that, since whether the network signal and the DC power from the first Ethernet network terminal 11 is transmitted via the first pair of pins or the second pair of pins (or via the third pair of pins or the fourth pair of pins) is determined by the power sourcing equipment (not shown) (i.e., unknown to the powered device), the polarities of relative voltage levels between the first and second center taps (OP1, OP2) (or the third and fourth center taps (OP3, OP4)) are undetermined beforehand. Therefore, the voltages transferred to the power module 3 via the first and second center taps (OP1, OP2) (or the third and fourth center taps (OP3, OP4)) need to be rectified so as to ensure proper operation of the power module 3. The same applies to the network signal and the DC power from the second Ethernet network terminal 12.

In particular, the power module 3 includes a first bridge rectifier 31 connected to the first and second center taps (OP1, OP2) of the first and second transformers 251, 252 of the first transformer circuit 25, a second bridge rectifier 32 connected to the third and fourth center taps (OP3, OP4) of the third and fourth transformers 253, 254 of the first transformer circuit 25, a third bridge rectifier 33 connected to the first and second center taps (OP1', OP2') of the first and second transformers 261, 262 of the second transformer circuit 26, and a fourth bridge rectifier 34 connected to the third and fourth center taps (OP3', OP4') of the third and fourth transformers 263, 264 of the second transformer circuit 26.

Each of the first to fourth bridge rectifiers 31~34 is composed of four diodes (D1~D4). An anode of the diode (D1) and a cathode of the diode (D4) of the first bridge rectifier 31 are connected to the first center tap (OP1) of the first transformer 251 of the first transformer circuit 25. An anode of the diode (D3) and a cathode of the diode (D2) are connected to the second center tap (OP2) of the second transformer 252 of the first transformer circuit 25. Cathodes of the diodes (D1, D3) are connected to a positive node of an output side of the first bridge rectifier 31. Anodes of the diodes (D2, D4) are connected to a negative node of the output side of the first bridge rectifier 31. The first bridge rectifier 31 rectifies the voltages at the first and second center taps (OP1, OP2) of the first and second transformers 251, 252 of the first transformer circuit 25.

Similarly, an anode of the diode (D1) and a cathode of the diode (D4) of the second bridge rectifier 32 are connected to the third center tap (OP3) of the third transformer 253 of the first transformer circuit 25. An anode of the diode (D3) and a cathode of the diode (D2) are connected to the fourth center tap (OP4) of the fourth transformer 254 of the first transformer circuit 25. Cathodes of the diodes (D1, D3) are connected to a positive node of an output side of the second bridge rectifier 32. Anodes of the diodes (D2, D4) are connected to a negative node of the output side of the second bridge rectifier 32. The second bridge rectifier 32 rectifies the voltages at the third and fourth center taps (OP3, OP4) of the third and fourth transformers 253, 254 of the first transformer circuit 25.

Similarly, an anode of the diode (D1) and a cathode of the diode (D4) of the third bridge rectifier 33 are connected to the first center tap (OP1') of the first transformer 261 of the second transformer circuit 26. An anode of the diode (D3) and a cathode of the diode (D2) are connected to the second center tap (OP2') of the second transformer 262 of the second transformer circuit 26. Cathodes of the diodes (D1, D3) are connected to a positive node of an output side of the third bridge rectifier 33. Anodes of the diodes (D2, D4) are connected to a negative node of the output side of the third bridge rectifier 33. The third bridge rectifier 33 rectifies the voltages at the first and second center taps (OP1', OP2') of the first and second transformers 261, 262 of the second transformer circuit 26.

Similarly, an anode of the diode (D1) and a cathode of the diode (D4) of the fourth bridge rectifier 34 are connected to the third center tap (OP3') of the third transformer 263 of the second transformer circuit 26. An anode of the diode (D3) and a cathode of the diode (D2) are connected to the fourth center tap (OP4') of the fourth transformer 264 of the second transformer circuit 26. Cathodes of the diodes (D1, D3) are connected to a positive node of an output side of the fourth bridge rectifier 34. Anodes of the diodes (D2, D4) are connected to a negative node of the output side of the fourth bridge rectifier 34. The fourth bridge rectifier 34 rectifies the voltages at the third and fourth center taps (OP3', OP4') of the third and fourth transformers 263, 264 of the second transformer circuit 26.

Take the first bridge rectifier 31 as an example, if the DC power is transmitted from the first network line 81 to the transformer module 3 via the first pair of pins, instead of the second pair of pins, of the first Ethernet network terminal 11, the voltage at the first center tap (OP1) of the first transformer 251 would be the voltage of the DC power, while the voltage at the second center tap (OP2) of the second transformer 252 would be zero. As a result, the diodes (D1) and (D2) are turned on (while the diodes (D3) and (D4) are turned off), so that the voltage at the output side of the first bridge rectifier 31 is equal to the voltage at the first center tap (OP1) of the first transformer 251. On the other hand, if the DC power is transmitted from the first network line 81 to the transformer module 3 via the second pair of pins, instead of the first pair of pins, of the first Ethernet network terminal 11, the voltage at the first center tap (OP1) of the first transformer 251 would be zero, while the voltage at the second center tap (OP2) of the second transformer 252 would be the voltage of the DC power. As a result, the diodes (D3) and (D4) are turned on (while the diodes (D1) and (D2) are turned off), so that the voltage of the output side of the first bridge rectifier 31 is equal to the voltage at the first center tap (OP2) of the first transformer 251. Since the same is true for the second, third and fourth bridge rectifiers 32, 33, 34, further details concerning operations of the bridge rectifiers 32, 33, 34 are omitted herein for the sake of brevity.

It is important to note that the positive nodes of the output sides of the first and second bridge rectifiers 31, 32 are coupled to each other, that the negative nodes of the output sides of the first and second bridge rectifiers 31, 32 are coupled to each other, that the positive nodes of the output sides of the third and fourth bridge rectifiers 33, 34 are coupled to each other, and that the negative nodes of the output sides of the third and fourth bridge rectifiers 33, 34 are coupled to each other. Therefore, with regard to the first Ethernet network terminal 11, where the DC power carried on the network signal is transmitted from the first network line 81 to the transformer module 3 via the first and third pairs of pins, since the DC power transmitted by a single pair of pins can have a maximum magnitude of 15.4 watts according to the IEEE802.3af international standard, with the parallel connection between the output sides of the first and second bridge rectifiers 31, 32, an output current of the first and second bridge rectifiers 31, 32 combined is twice that of each of the first and second bridge rectifiers 31, 32, while an output voltage (Vo1) of the first and second bridge rectifiers 31, 32 combined remains identical to that of each of the first and second bridge rectifiers 31, 32. Therefore, a magnitude of an output power outputted by the first and second bridge rectifiers 31, 32 combined is doubled to a maximum magnitude of 30.8 watts. In the same manner, a magnitude of an output power of the third and fourth bridge rectifiers 33, 34 combined is also doubled to a maximum magnitude of 30.8 watts.

Furthermore, the power module 3 of this embodiment further includes first and second DC/DC converters 35, 36 for providing stable DC power to the power-consuming components of the powered device, where the output sides of the first and second bridge rectifiers 31, 32 are coupled to the first DC/DC converter 35, and the output sides of the third and fourth bridge rectifiers 33, 34 are coupled to the second DC/DC converter 36. Moreover, output sides of the first and second DC/DC converters 35, 36 are connected to each other in parallel to generate a supplying voltage (Vout) with the supplying power of a maximum magnitude of 61.6 watts since each of the output sides of the first and second DC/DC converters 35, 36 provides a maximum magnitude of 30.8 watts of power.

In other words, if the DC power carried on the network signal is transmitted from each of the first and second network lines 81, 82 to the transformer module 3 via only the first pair of pins of the respective one of the first and second Ethernet network terminals 11, 12, then the power at the first center tap (OP1, OP1') of each of the first and second transformer circuits 25, 26 has a maximum magnitude of 15.4 watts, and therefore the supplying power of the supply voltage (Vout) amounts to a maximum magnitude of 30.8 watts due to the fact that the first and second DC/DC converters 35, 36 are connected in parallel. In other words, if the DC power is transmitted from the network lines to the transformer module 3 via (M) pairs of pins of each of (N) number of Ethernet network ports 1, where (M is 1 or 2) and (N≧2), then the maximum magnitude of supplying power is (N×M×15.4) watts. Consequently, the magnitude of the supplying power is made greater than the DC power carried on the network signal as transmitted by each of the network lines, and is therefore sufficient for driving the power-consuming components of the powered device. Moreover, although the network equipment 10 of this embodiment complies with the IEEE802.3af international standard, it can also be configured to comply with the IEEE802.3at international standard in other embodiments.

It is worth to mention that the supplying power outputted by the power module 3 is for supply to the power-consuming components of the powered device, an example of which is the signal processing unit 4. Since the magnitude of the necessary driving power may be different for each of the power-consuming components, as disclosed previously, the network equipment 10 of the present invention may optionally include a power management circuit (not shown) for receiving and managing the supplying power, and distributing the supplying power to the power-consuming components as required.

Figure 6:
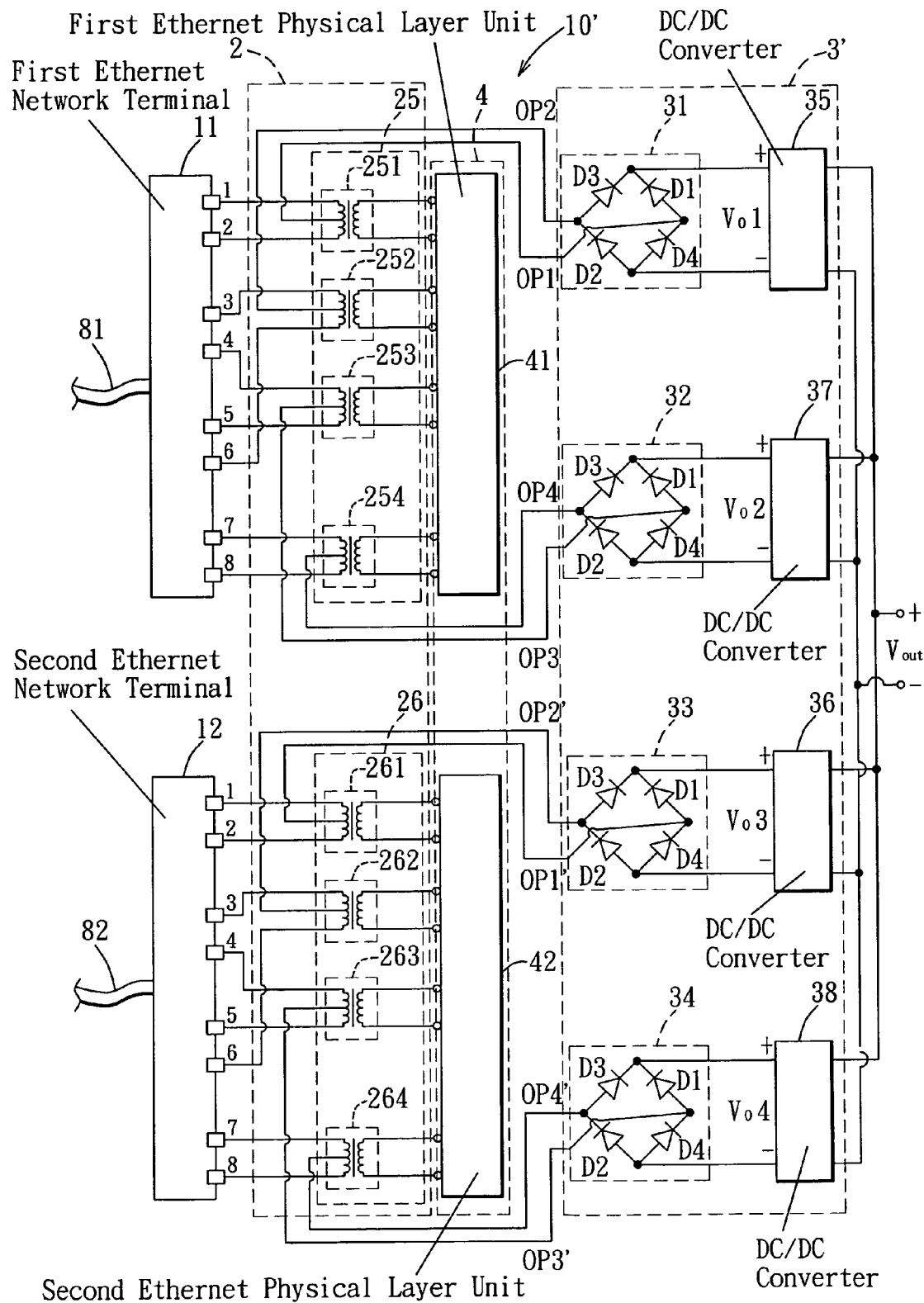
FIG. 6 is a circuit block diagram of the second preferred embodiment of a network equipment according to the present invention.

Referring to FIG. 6, the second preferred embodiment of the network equipment 10' according to the present invention is generally similar to the first preferred embodiment, and only differs from the first preferred embodiment in that the power module 3' of the second preferred embodiment includes four DC/DC converters 35~38 respectively coupled to the first to fourth bridge rectifiers 31~34 for stabilizing the output voltages (Vo1~Vo4) at the output sides of the first to fourth bridge rectifiers 31~34. The output sides of the four DC/DC converters 35~38 are connected in parallel to provide the supplying voltage (Vout). In other words, the supplying power outputted by the power module 3' is the summation of the powers of the output voltages (Vo1~Vo4) at the output sides of the first to fourth bridge rectifiers 31~34, i.e., a maximum magnitude of 15.4×4=61.6 watts. Like the previous embodiment, the supplying power outputted by the power module 3' of the network equipment 10' has a maximum magnitude of M×N×15.4 watts where (N) is the number of Ethernet network ports 1 included in the network equipment 10' and is not less than 2 and (M) is the number of pairs of pins of each Ethernet network port 1 used for transmitting the DC power and can be 1 or 2.

Figure 7:
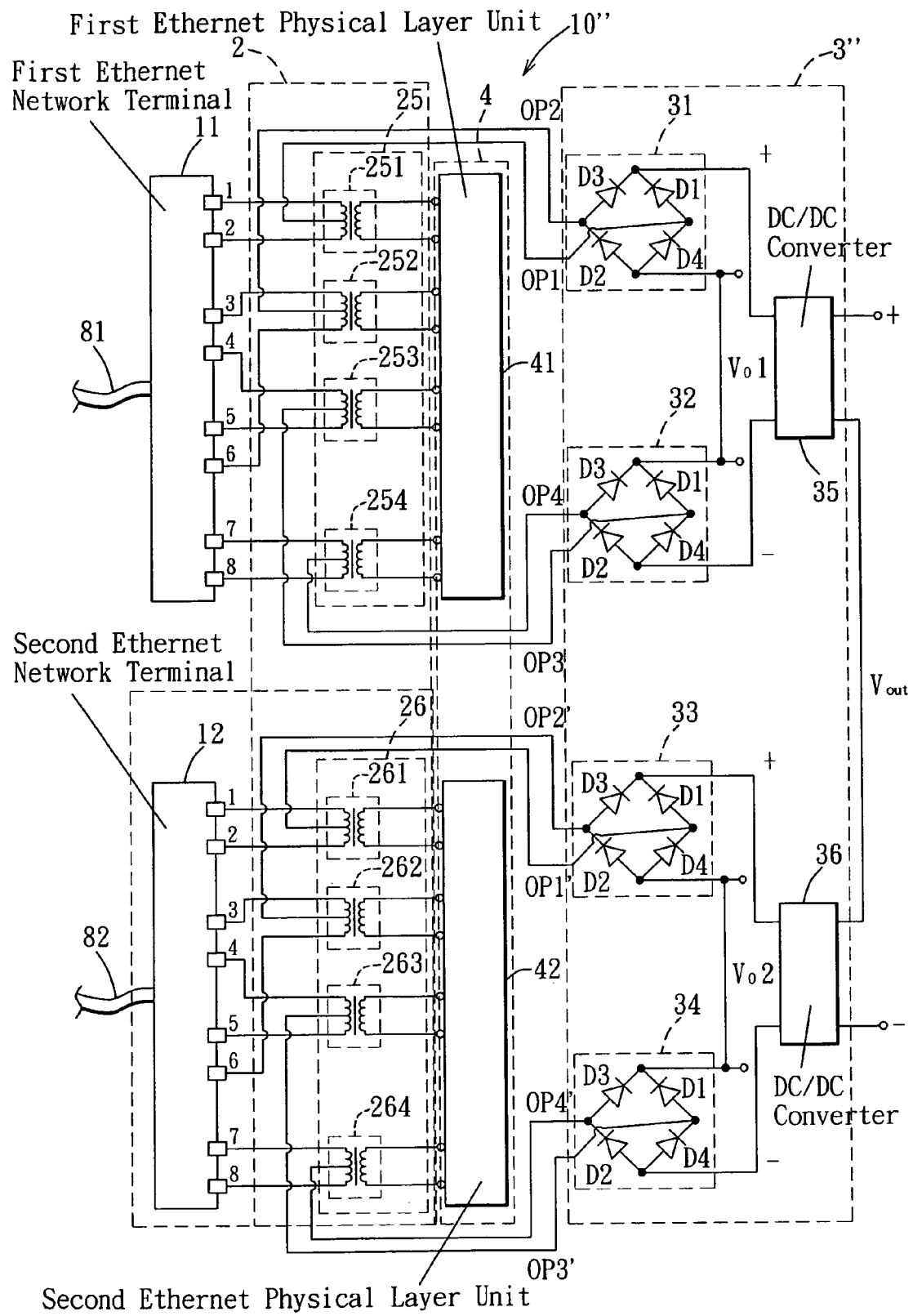
FIG. 7 is a circuit block diagram of the third preferred embodiment of a network equipment according to the present invention.

Referring to FIG. 7, the third preferred embodiment of the network equipment 10" of the present invention is generally similar to the first preferred embodiment, and only differs from the first preferred embodiment in that, contrary to connecting the output sides of the rectifiers in parallel to increase the output currents so as to increase the magnitude of the supplying power as with the first preferred embodiment, the output sides of the first and second bridge rectifiers 31, 32 (or the third and fourth bridge rectifiers 33, 34) of the third preferred embodiment are connected to one another in series so as to increase the output voltage (Vo1) (or the output voltage (Vo2)) to thereby increase the magnitude of the supplying power. In particular, as shown in FIG. 7, the positive node of the output side of the second bridge rectifier 32 is connected to the negative node of the output side of the first bridge rectifier 31. In addition, the positive node of the output side of the fourth bridge rectifier 34 is connected to the negative node of the output side of the third bridge rectifier 33.

Moreover, the positive node of the output side of the first bridge rectifier 31 and the negative node of the output side of the second bridge rectifier 32 are connected to the first DC/DC converter 35, while the positive node of the output side of the third bridge rectifier 33 and the negative node of the output side of the fourth bridge rectifier 34 are connected to the second DC/DC converter 36. The output sides of the first and second DC/DC converters 35, 36 are connected in series, i.e., by connecting a negative node of the output side of the first DC/DC converter 35 to a positive node of the second DC/DC converter 36, such that the supplying voltage (Vout) is the summation of the output voltages (Vo1, Vo2). Therefore, the supplying power is increased accordingly. In other words, if the DC power is transmitted from the network lines to the transformer module 3 via (M) pairs of pins of each of (N) number of Ethernet network ports 1, and if output sides of (N) number of DC/DC converters respectively corresponding to the (N) number of Ethernet network ports 1 are connected in series, where (M is 1 or 2) and (N≧2), then the maximum magnitude of supplying power is (N×M×15.4) watts.

Figure 8:
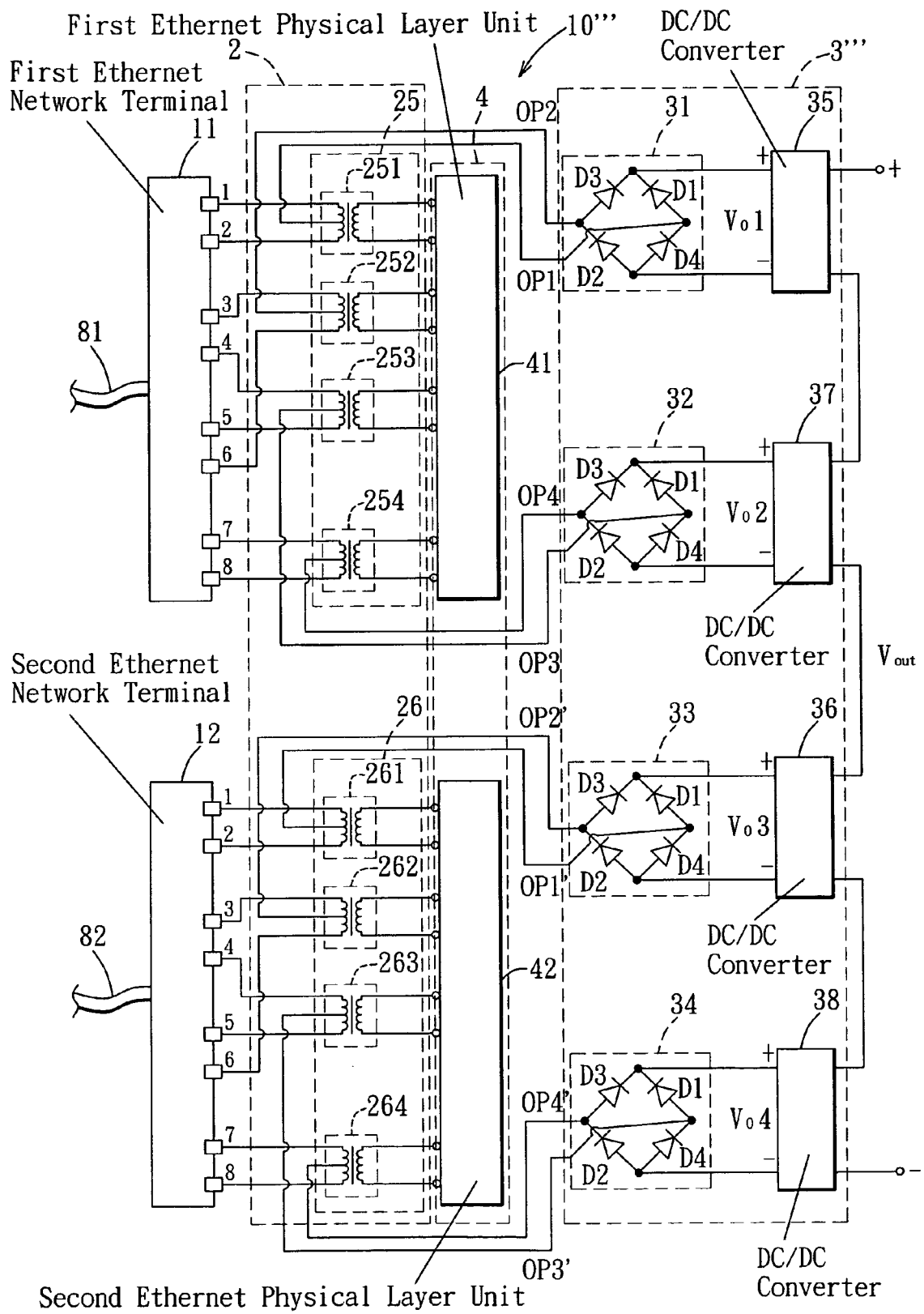
FIG. 8 is a circuit block diagram of the fourth preferred embodiment of a network equipment according to the present invention.

Referring to FIG. 8, the fourth preferred embodiment of the network equipment 10''' according to the present invention is generally similar to the third preferred embodiment, and only differs from the third preferred embodiment in that the power module 3''' of the fourth preferred embodiment includes four DC/DC converters 35~38 respectively coupled to the first to fourth bridge rectifiers 31~34 for stabilizing the output voltages (Vo1~Vo4) at the output sides of the first to fourth bridge rectifiers 31~34. The output sides of the four DC/DC converters 35~38 are connected in series to provide the supplying voltage (Vout) to thereby acquire the output power with a maximum magnitude of 15.4×4=61.6 watts.

In sum, the network equipment for use in a powered device of a Power over Ethernet (PoE) system according to the present invention utilizes a plurality of Ethernet network ports 1 for transmitting DC powers that are carried on network signals transmitted from Ethernet network lines, and that have a magnitude smaller than a power necessary for driving power-consuming components of the powered device, and with series/parallel combinations of the DC powers transmitted via the power module 3, is able to provide an output power with a magnitude that is sufficient for driving the power-consuming components of the powered device, thereby making it possible for devices with higher power-consuming requirements to be able to use the Power over Ethernet technology in accordance with the IEEE802.3af international standard.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A network equipment for use in a powered device of a Power over Ethernet (PoE) system, and adapted to be connected to a plurality of network lines, each of the network lines transmitting a network signal and a direct-current (DC) power carried on the network signal, the DC power having a magnitude that is smaller than a power necessary for driving power-consuming components of the powered device, said network equipment comprising:

a plurality of Ethernet network ports, each of which is adapted to be coupled to a respective one of the network lines;

a transformer module coupled to said Ethernet network ports, and configured to separate the DC powers from the network signals transmitted thereto from the network lines via said Ethernet network ports;

a power module coupled to said transformer module for combining the DC powers separated from the network signals and received from said transformer module into a supplying power; and a signal processing circuit coupled to said power module for receiving at least a portion of the supplying power therefrom, and coupled to said transformer module for processing the network signals received therefrom;

wherein the supplying power outputted by said power module has a magnitude that is sufficient for driving the power-consuming components of the powered device;

wherein said transformer module includes a first transformer circuit coupled between one of said Ethernet network ports and said signal processing circuit, and a second transformer circuit coupled between another one of said Ethernet network ports and said signal processing circuit;

wherein said power module includes a first bridge rectifier connected to said first transformer circuit, and a second bridge rectifier connected to said first transformer circuit; and wherein said power module further includes a DC/DC converter, each of said first and second bridge rectifiers having an output side, said output sides of said first and second bridge rectifiers being connected to each other in parallel, and being coupled to said DC/DC converter.

2. The network equipment as claimed in claim 1, the network lines including a first network line and a second network line, wherein said Ethernet network ports include a first Ethernet network terminal adapted to be coupled to the first network line, and a second Ethernet network terminal adapted to be coupled to the second network line, each of said first and second Ethernet network terminals including first, second, third and fourth pairs of pins, the network signal and the DC power carried on the network signal being transmitted from the first network line to said transformer module via at least a pair of pins selected from the group consisting of one of the first and second pairs of pins of said first Ethernet network terminal, one of the third and fourth pairs of pins of said first Ethernet network terminal, and a combination thereof, the network signal and the DC power carried on the network signal being transmitted from the second network line to said transformer module via at least a pair of pins selected from the group consisting of one of the first and second pairs of pins of said second Ethernet network terminal, one of the third and fourth pairs of pins of said second Ethernet network terminal, and a combination thereof.

3. The network equipment as claimed in claim 2, wherein:
said first transformer circuit is coupled between said first Ethernet network terminal and said signal processing circuit, and has four center taps respectively corresponding to said first, second, third and fourth pairs of pins of said first Ethernet network terminal, voltage of the DC power received from the first network line via said first Ethernet network terminal being transferred to said power module from at least one of said center taps corresponding to said at least one selected pair of pins of said first Ethernet network terminal; and said second transformer circuit is coupled between said second Ethernet network terminal and said signal processing circuit, and has four center taps respectively corresponding to said first, second, third and fourth pairs of pins of said second Ethernet network terminal, voltage of the DC power received from the second network line via said second Ethernet network terminal being transferred to said power module from at least one of said center taps corresponding to said at least one selected pair of pins of said second Ethernet network terminal.

4. The network equipment as claimed in claim 3, wherein said first transformer circuit includes:

a first transformer connected between said first pair of pins of said first Ethernet network terminal and said signal processing circuit, and having a first center tap connected to said power module;

a second transformer connected between said second pair of pins of said first Ethernet network terminal and said signal processing circuit, and having a second center tap connected to said power module;

a third transformer connected between said third pair of pins of said first Ethernet network terminal and said signal processing circuit, and having a third center tap connected to said power module; and a fourth transformer connected between said fourth pair of pins of said first Ethernet network terminal and said signal processing circuit, and having a fourth center tap connected to said power module;

said first, second, third and fourth center taps of said first, second, third and fourth transformers of said first transformer circuit cooperating to form said four center taps of said first transformer circuit.

5. The network equipment as claimed in claim 4, wherein said second transformer circuit includes:

a first transformer connected between said first pair of pins of said second Ethernet network terminal and said signal processing circuit, and having a first center tap connected to said power module;

a second transformer connected between said second pair of pins of said second Ethernet network terminal and said signal processing circuit, and having a second center tap connected to said power module;

a third transformer connected between said third pair of pins of said second Ethernet network terminal and said signal processing circuit, and having a third center tap connected to said power module; and a fourth transformer connected between said fourth pair of pins of said second Ethernet network terminal and said signal processing circuit, and having a fourth center tap connected to said power module;

said first, second, third and fourth center taps of said first, second, third and fourth transformers of said second transformer circuit cooperating to form said four center taps of said second transformer circuit.

6. The network equipment as claimed in claim 5,
wherein said first bridge rectifier is connected to said first and second center taps of said first and second transformers of said first transformer circuit;

wherein said second bridge rectifier is connected to said third and fourth center taps of said third and fourth transformers of said first transformer circuit;

and wherein said power module further includes:
a third bridge rectifier connected to said first and second center taps of said first and second transformers of said second transformer circuit; and a fourth bridge rectifier connected to said third and fourth center taps of said third and fourth transformers of said second transformer circuit.

7. The network equipment as claimed in claim 4, wherein:
said first bridge rectifier is connected to said first and second center taps of said first and second transformers of said first transformer circuit; and said second bridge rectifier is connected to said third and fourth center taps of said third and fourth transformers of said first transformer circuit.

8. The network equipment as claimed in claim 2, wherein each of said first and second Ethernet network terminals is an RJ-45 terminal.

9. The network equipment as claimed in claim 8, wherein said first pair of pins of each of said first and second Ethernet network terminals includes first and second pins of the RJ-45 terminal, said second pair of pins of each of said first and second Ethernet network terminals including third and sixth pins of the RJ-45 terminal, said third pair of pins of each of said first and second Ethernet network terminals including fourth and fifth pins of the RJ-45 terminal, said fourth pair of pins of each of said first and second Ethernet network terminals including seventh and eighth pins of the RJ-45 terminal.

10. A network equipment for use in a powered device of a Power over Ethernet (PoE) system, and adapted to be connected to a plurality of network lines, each of the network lines transmitting a network signal and a direct-current (DC) power carried on the network signal, the DC power having a magnitude that is smaller than a power necessary for driving power-consuming components of the powered device, said network equipment comprising:

a plurality of Ethernet network ports, each of which is adapted to be coupled to a respective one of the network lines;

a transformer module coupled to said Ethernet network sorts and configured to separate the DC powers from the network signals transmitted thereto from the network lines via said Ethernet network ports;

a power module coupled to said transformer module for combining the DC powers separated from the network signals and received from said transformer module into a supplying power; and a signal processing circuit coupled to said power module for receiving at least a portion of the supplying power therefrom, and coupled to said transformer module for processing the network signals received therefrom;

wherein the supplying power outputted by said power module has a magnitude that is sufficient for driving the power-consuming components of the powered device;

wherein said transformer module includes a first transformer circuit coupled between one of said Ethernet network ports and said signal processing circuit, and a second transformer circuit coupled between another one of said Ethernet network ports and said signal processing circuit:

wherein said power module includes a first bridge rectifier connected to said first transformer circuit, a second bridge rectifier connected to said first transformer circuit, a third bridge rectifier connected to said second transformer circuit, a fourth bridge rectifier connected to said second transformer circuit, and four DC/DC converters coupled respectively to said first, second, third and fourth bridge rectifiers, and having output terminals that are connected together in one of a series connection and a parallel connection.

11. The network equipment as claimed in claim 10, the network lines including a first network line and a second network line, wherein said Ethernet network ports include a first Ethernet network terminal adapted to be coupled to the first network line, and a second Ethernet network terminal adapted to be coupled to the second network line, each of said first and second Ethernet network terminals including first, second, third and fourth pairs of pins, the network signal and the DC power carried on the network signal being transmitted from the first network line to said transformer module via at least a pair of pins selected from the group consisting of one of the first and second pairs of pins of said first Ethernet network terminal, one of the third and fourth pairs of pins of said first Ethernet network terminal, and a combination thereof, the network signal and the DC power carried on the network signal being transmitted from the second network line to said transformer module via at least a pair of pins selected from the group consisting of one of the first and second pairs of pins of said second Ethernet network terminal, one of the third and fourth pairs of pins of said second Ethernet network terminal, and a combination thereof;

wherein said first transformer circuit is coupled between said first Ethernet network terminal and said signal processing circuit, and having four center taps respectively corresponding to said first, second, third and fourth pairs of pins of said first Ethernet network terminal, voltage of the DC power received from the first network line via said first Ethernet network terminal being transferred to said power module from at least one of said center taps corresponding to said at least one selected pair of pins of said first Ethernet network terminal, and wherein said second transformer circuit is coupled between said second Ethernet network terminal and said signal processing circuit, and having four center taps respectively corresponding to said first, second, third and fourth pairs of pins of said second Ethernet network terminal, voltage of the DC power received from the second network line via said second Ethernet network terminal being transferred to said power module from at least one of said center taps corresponding to said at least one selected pair of pins of said second Ethernet network terminal;

wherein said first transformer circuit includes a first transformer connected between said first pair of pins of said first Ethernet network terminal and said signal processing circuit, and having a first center tap connected to said power module, a second transformer connected between said second pair of pins of said first Ethernet network terminal and said signal processing circuit, and having a second center tap connected to said power module, a third transformer connected between said third pair of pins of said first Ethernet network terminal and said signal processing circuit, and having a third center tap connected to said power module, and a fourth transformer connected between said fourth pair of pins of said first Ethernet network terminal and said signal processing circuit, and having a fourth center tap connected to said power module, said first, second, third and fourth center taps of said first, second, third and fourth transformers of said first transformer circuit cooperating to form said four center taps of said first transformer circuit;

wherein said second transformer circuit includes a first transformer connected between said first pair of pins of said second Ethernet network terminal and said signal processing circuit, and having a first center tap connected to said power module, a second transformer connected between said second pair of pins of said second Ethernet network terminal and said signal processing circuit, and having a second center tap connected to said power module, a third transformer connected between said third pair of pins of said second Ethernet network terminal and said signal processing circuit, and having a third center tap connected to said power module, and a fourth transformer connected between said fourth pair of pins of said second Ethernet network terminal and said signal processing circuit, and having a fourth center tap connected to said power module, said first, second, third and fourth center taps of said first, second, third and fourth transformers of said second transformer circuit cooperating to form said four center taps of said second transformer circuit;

wherein said first bridge rectifier is connected to said first and second center taps of said first and second transformers of said first transformer circuit;

wherein said second bridge rectifier connected to said third and fourth center taps of said third and fourth transformers of said first transformer circuit;

wherein said third bridge rectifier connected to said first and second center taps of said first and second transformers of said second transformer circuit; and wherein said fourth bridge rectifier connected to said third and fourth center taps of said third and fourth transformers of said second transformer circuit.

12. A network equipment for use in a powered device of a Power over Ethernet (PoE) system, and adapted to be connected to a plurality of network lines, each of the network lines transmitting a network signal and a direct-current (DC) power carried on the network signal, the DC power having a magnitude that is smaller than a power necessary for driving power-consuming components of the powered device, said network equipment comprising:

a plurality of Ethernet network ports, each of which is adapted to be coupled to a respective one of the network lines;

a transformer module coupled to said Ethernet network ports, and configured to separate the DC powers from the network signals transmitted thereto from the network lines via said Ethernet network ports;

a power module coupled to said transformer module for combining the DC powers separated from the network signals and received from said transformer module into a supplying power; and a signal processing circuit coupled to said power module for receiving at least a portion of the supplying power therefrom, and coupled to transformer module for processing the network signals received therefrom;

wherein the supplying power outputted by said power module has a magnitude that is sufficient for driving the power-consuming components of the powered device;

wherein said power module includes a first bridge rectifier connected to said first transformer circuit, a second bridge rectifier connected to said first transformer circuit, a third bridge rectifier connected to said second transformer circuit, a fourth bridge rectifier connected to said second transformer circuit, a first DC/DC converter, and a second DC/DC converter, each of said first and second bridge rectifiers having an output side, said output sides of said first and second bridge rectifiers being connected to each other in parallel, and being coupled to said first DC/DC converter, each of said third and fourth bridge rectifiers having an output side, said output sides of said third and fourth bridge rectifiers being connected to each other in parallel, and being coupled to said second DC/DC converter.

13. The network equipment as claimed in claim 12, the network lines including a first network line and a second network line, wherein said Ethernet network ports include a first Ethernet network terminal adapted to be coupled to the first network line, and a second Ethernet network terminal adapted to be coupled to the second network line, each of said first and second Ethernet network terminals including first, second, third and fourth pairs of pins, the network signal and the DC power carried on the network signal being transmitted from the first network line to said transformer module via at least a pair of pins selected from the group consisting of one of the first and second pairs of pins of said first Ethernet network terminal, one of the third and fourth pairs of pins of said first Ethernet network terminal, and a combination thereof, the network signal and the DC power carried on the network signal being transmitted from the second network line to said transformer module via at least a pair of pins selected from the group consisting of one of the first and second pairs of pins of said second Ethernet network terminal, one of the third and fourth pairs of pins of said second Ethernet network terminal, and a combination thereof;

wherein said first transformer circuit is coupled between said first Ethernet network terminal and said signal processing circuit, and having four center taps respectively corresponding to said first, second, third and fourth pairs of pins of said first Ethernet network terminal, voltage of the DC power received from the first network line via said first Ethernet network terminal being transferred to said power module from at least one of said center taps corresponding to said at least one selected pair of pins of said first Ethernet network terminal, and wherein said second transformer circuit is coupled between said second Ethernet network terminal and said signal processing circuit, and having four center taps respectively corresponding to said first, second, third and fourth pairs of pins of said second Ethernet network terminal, voltage of the DC power received from the second network line via said second Ethernet network terminal being transferred to said power module from at least one of said center taps corresponding to said at least one selected pair of pins of said second Ethernet network terminal;

wherein said first transformer circuit includes
a first transformer connected between said first pair of pins of said first Ethernet network terminal and said signal processing circuit, and having a first center tap connected to said power module, a second transformer connected between said second pair of pins of said first Ethernet network terminal and said signal processing circuit, and having a second center tap connected to said power module, a third transformer connected between said third pair of pins of said first Ethernet network terminal and said signal processing circuit, and having a third center tap connected to said power module, and a fourth transformer connected between said fourth pair of pins of said first Ethernet network terminal and said signal processing circuit, and having a fourth center tap connected to said power module, said first, second, third and fourth center taps of said first, second, third and fourth transformers of said first transformer circuit cooperating to form said four center taps of said first transformer circuit;

wherein said second transformer circuit includes
a first transformer connected between said first pair of pins of said second Ethernet network terminal and said signal processing circuit, and having a first center tap connected to said power module, a second transformer connected between said second pair of pins of said second Ethernet network terminal and said signal processing circuit, and having a second center tap connected to said power module, a third transformer connected between said third pair of pins of said second Ethernet network terminal and said signal processing circuit, and having a third center tap connected to said power module, and a fourth transformer connected between said fourth pair of pins of said second Ethernet network terminal and said signal processing circuit, and having a fourth center tap connected to said power module, said first, second, third and fourth center taps of said first, second, third and fourth transformers of said second transformer circuit cooperating to form said four center taps of said second transformer circuit;

wherein said first bridge rectifier is connected to said first and second center taps of said first and second transformers of said first transformer circuit;

wherein said second bridge rectifier connected to said third and fourth center taps of said third and fourth transformers of said first transformer circuit;

wherein said third bridge rectifier connected to said first and second center taps of said first and second transformers of said second transformer circuit; and wherein said fourth bridge rectifier connected to said third and fourth center taps of said third and fourth transformers of said second transformer circuit.

* * * * *